Dec. 19, 1939. M. E. DAYTON 2,184,038
SWIVEL CASTER
Filed Nov. 3, 1937
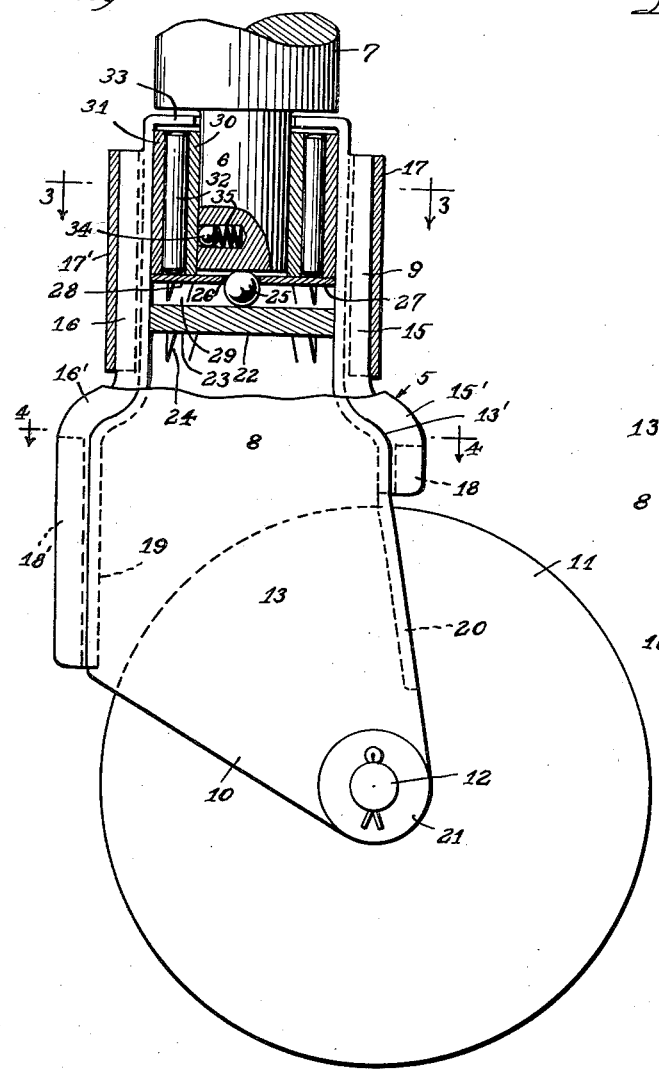
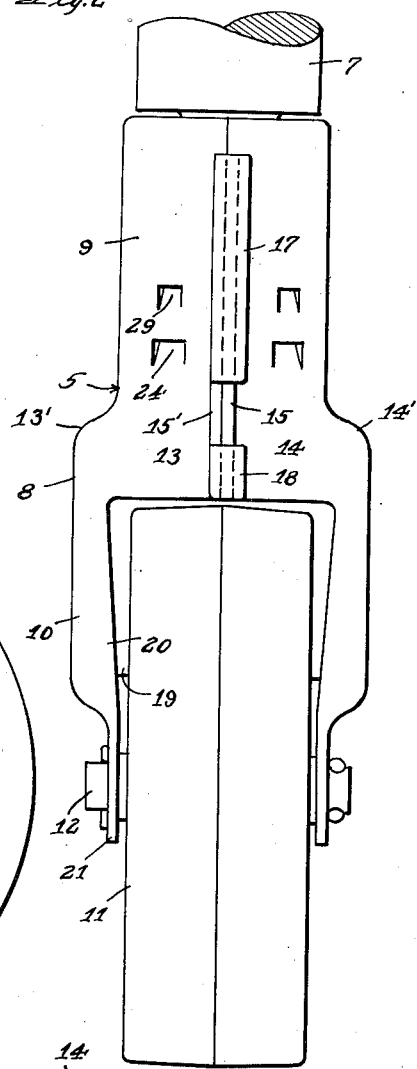
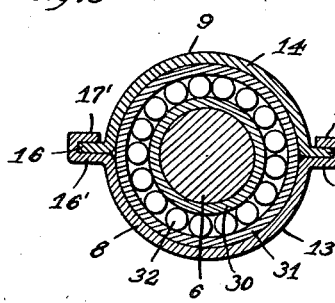
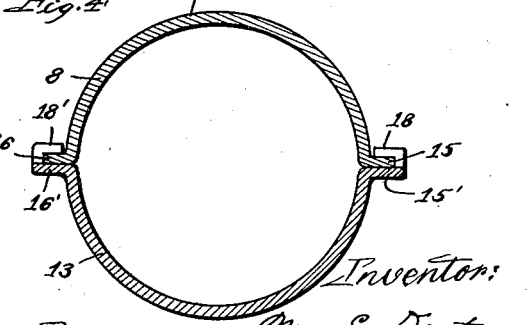
Inventor:
Max E. Dayton
By McCanna, Wintercorn & Morebach
Attys Patented Dec. 19, 1939

2,184,038

UNITED STATES PATENT OFFICE 2,184,038

SWIVEL CASTER

Max E. Dayton, Rockford, Ill., assignor to The Atwood Vacuum Machine Company, Rockford, Ill., a copartnership composed of Seth B. Atwood and James T. Atwood Application November 3, 1937, Serial No. 172,548

8 Claims. (Cl. 16—22)

This invention relates to casters generally, and more particularly an anti-friction swivel caster especially designed for use as a detachable front end caster support for a two-wheeled house type automobile trailer.

The principal object of my invention is to provide an easy working caster of stamped sheet metal construction for lightness and economy, the same being so designed that despite its light sheet metal construction it nevertheless possesses ample strength and rigidity and is extremely serviceable.

Another object is to provide an improved combination roller and ball bearing in the neck of the caster frame which not only provides for easy swivelling of the caster with respect to the leg of the trailer, but also is designed to permit quick and easy application or removal of the caster from the leg.

The invention is illustrated in the accompanying drawing, in which—

Figure 1 is a view partly in side elevation and partly in central vertical section through a swivel caster made in accordance with my invention, the same being shown applied to the trailer leg;

Fig. 2 is a front view of Fig. 1, and

Figs. 3 and 4 are sections on the correspondingly numbered lines of Fig. 1.

The same reference numerals are applied to corresponding parts throughout the views.

The caster, indicated generally by the numeral 5, is illustrated as swiveled on the reduced cylindrical end 6 of the front leg 7 of a two-wheeled house type automobile trailer. The caster, generally speaking, comprises a sheet metal frame or body 8 formed to provide a hollow substantially cylindrical neck 9 at the upper end and a fork 10 at the lower end carrying therein a large roller 11 on an axle 12. This caster, it should be understood, measures approximately 10" in height in order to support the leg 7 at the required elevation, and inasmuch as this caster has to be put on and taken off whenever the trailer is parked, it can easily be appreciated that light weight construction is important, due to the size of the unit. Lightness is obtained by making both the frame 8 and roller 11 of hollow sheet metal construction. The requisite strength and rigidity are built into the frame 8 by special forming of the two sections 13 and 14 thereof. For one thing, attention is called to the longitudinal flanges 15 and 16 on the edges of section 14 extending vertically up the front and back of the frame alongside companion flanges 15' and 16' on the edges of the mating section 13. These flanges not only greatly strengthen and stiffen the frame in the plane of the roller 11, but they provide a means whereby the two sections are adapted to be secured together, long and short lugs 17 and 18 being provided on the flange 15', and two other long lugs 17' and 18' being provided on the flange 16' which are bent over the edges of the adjacent flanges 15 and 16, respectively, and "wrapped" around the same to clinch the sections permanently in assembled relation. The shoulders 13' and 14' intermediate the ends of sections 13 and 14 defined adjacent the lower end of the hollow neck 9 where the sections are enlarged to form the top of the fork 10, also means added strength and rigidity both in the plane of the wheel 11 and in a transverse plane. The legs of the fork are formed to channel-shaped cross-section, as indicated by the walls 19 and 20, to further strengthen and stiffen the frame, and it will be observed that at the lower end of the fork the channel formation tapers off to the flat form of the ears 21 through which the axle 12, previously mentioned, is entered. It should be evident, therefore, that the caster frame while of light sheet metal construction and such as can be made at relatively low cost, is nevertheless as strong as necessary and very serviceable.

The sectional sheet metal construction of the caster frame 8 is of further advantage in facilitating the assembling of a simple and economical form of ball and roller bearing in the hollow neck 9. A thick disk 22 rests on ledges 23 provided on the ends of struck-in lugs 24 in the walls of the sections 13 and 14 in the lower end of the neck portion 9. A hardened steel bearing ball 25 rests on the disk 22 and projects through a hole 26 of smaller diameter than the ball provided in the center of a thin disk 27 which is supported on ledges 28 provided by the upper ends of lugs 29 struck in from the walls of the sections 13 and 14 in the neck portion 9 in upwardly spaced relation to the lugs 24, previously mentioned. Inasmuch as the hole 26 is smaller in diameter than the ball 25, the ball cannot drop out when the caster is removed from the trailer leg, although the ball is permitted to project through the hole 26 sufficiently to engage the lower end of the reduced portion 6 of the leg 7 to assume end thrust with minimum frictional drag imposed on the turning of the caster. The disk 27 provides support around its marginal portion for the inner and outer race rings 30 and 31 for the rollers or needles 32 which provide an anti-friction radial bearing for the reduced cylindrical portion 6 of the trailer leg 7, insuring easy turning of the caster. An inturned annular flange 33 is formed on the upper end of the neck 9, half on each of the sections 13 and 14, and serves to retain the needle bearing parts 30—32 against upward displacement. The trailer leg is adapted to be slipped into the bearing ring 30 when the trailer is jacked up, and hence provision must be made for retaining the caster on the leg at least frictionally so that it is not necessary to hold it in place until the trailer is lowered onto the caster. The spring-pressed ball detent 34 which is confined in the radial bore 35 in the reduced portion 6 of the trailer leg 7 provides enough frictional drag by engagement with the inside of the bearing ring 30 to keep the caster in place and still permit easy removal of the caster when so desired.

It should be evident from the foregoing description that I have provided a very practical and serviceable swivel caster for the purpose mentioned, and one which by reason of its novel construction may be manufactured at a reasonably low price. The light sheet metal construction employed makes the caster light enough to be easily handled and carried. Despite its light sheet metal construction, the caster of my invention is just as strong and serviceable as most other heavier and costlier casters offered for a similar purpose.

It is believed the foregoing description conveys a good understanding of the objects and advantages of my invention. The appended claims have been drawn with a view to covering all legitimate modifications and adaptations.

I claim:

1. A caster for application to a supporting device having a cylindrical end portion, said caster comprising a wheel-carrying frame having a tubular neck to receive the cylindrical end portion of said device, an end thrust wall in said neck, a bearing ball resting thereon and engageable by the end of said cylindrical end portion for anti-friction support of the device, a centrally apertured plate centering said ball in said neck and supported thereby in spaced relation to said end thrust wall, and a radial bearing for said cylindrical end portion supported by said plate in said neck.

2. A caster for application to a supporting device having a cylindrical end portion, said caster comprising a wheel-carrying frame having a tubular neck to receive the cylindrical end portion of said device, said neck having inward projections in vertically spaced relation, a thrust plate resting on the lower projections, a bearing ball supported on said thrust plate, a centrally apertured plate centering said ball in its aperture and resting on the upper projections, said ball being engageable by the end of said cylindrical end portion for anti-friction support of the device, a radial bearing for said cylindrical end portion supported by the apertured plate in said neck, and means providing an annular projection on said neck above said radial bearing preventing endwise displacement thereof away from said apertured plate.

3. A caster comprising a hollow frame which initially is open but constructed to be closed in assembling, whereby to retain and hold in proper positions the parts previously assembled therein, said frame comprising a hollow neck portion and a fork portion, the neck portion being adapted to receive the end of the member to be supported on the caster and having projections on the inside thereof adapted to support a bearing thereon, an anti-friction bearing for said member engaging said projections so as to be properly located and supported in said neck when the frame is closed thereon, means for securing said frame in closed operative relation to said bearing, and a caster wheel supported in the fork of said frame.

4. A caster comprising a hollow frame which initially is open but constructed to be closed in assembling, whereby to retain and hold in proper positions the parts previously assembled therein, said frame comprising a hollow neck portion and a fork portion, the neck portion being adapted to receive the end of the member to be supported on the caster and having projections on the inside thereof adapted to support a bearing thereon, two plates in vertically spaced parallel relation arranged to engage said projections so as to be properly located and supported in said neck when the frame is closed thereon, the upper one of said plates having a central aperture provided therein, a bearing ball disposed in said aperture and supported on the lower one of said plates and adapted to engage the end of the member entered in the neck portion, means for securing said frame in closed operative relation to said plates, and a caster wheel supported in the fork of said frame.

5. A caster comprising a hollow frame which initially is open but constructed to be closed in assembling, whereby to retain and hold in proper positions the parts previously assembled therein, said frame comprising a hollow neck portion and a fork portion, the neck portion being adapted to receive the end of the member to be supported on the caster and having projections on the inside thereof adapted to support a bearing thereon, two plates in vertically spaced parallel relation arranged to engage said projections so as to be properly located and supported in said neck when the frame is closed thereon, the upper one of said plates having a central aperture provided therein, a bearing ball disposed in said aperture and supported on the lower one of said plates and adapted to engage the end of the member entered in the neck portion, a radial bearing for lateral support of the member entered in the neck portion and arranged to be supported on the marginal portion of the upper one of said plates, means for securing said frame in closed operative relation to said plates and radial bearing, and a caster wheel supported in the fork of said frame.

6. A caster comprising a hollow frame which initially is open but constructed to be closed in assembling, whereby to retain and hold in proper positions the parts previously assembled therein, said frame comprising a hollow neck portion and a fork portion, the neck portion being adapted to receive the end of the member to be supported on the caster and having projections on the inside thereof adapted to support a bearing thereon, two plates in vertically spaced parallel relation arranged to engage said projections so as to be properly located and supported in said neck when the frame is closed thereon, the upper one of said plates having a central aperture provided therein, a bearing ball disposed in said aperture and supported on the lower one of said plates and adapted to engage the end of the member entered in the neck portion, a radial bearing for lateral support of the member entered in the neck portion and arranged to be supported on the marginal portion of the upper one of said plates, other projections on the inside of said neck portion in vertically spaced relation above the aforesaid projections for retaining the radial bearing against upward displacement from the neck when the frame is closed thereon, means for securing said frame in closed operative relation to said plates and radial bearing, and a caster wheel supported in the fork of said frame.

7. A caster comprising a hollow frame which initially is open but constructed to be closed in assembling, whereby to retain and hold in proper positions the parts previously assembled therein, said frame comprising a hollow neck portion and a fork portion, the neck portion being adapted to receive the end of the member to be supported on the caster and having projections on the inside thereof in vertically spaced relation to support and retain a bearing against vertical displacement, a radial bearing for said member disposed between said projections so as to be supported and retained in said neck when the frame is closed thereon, means for securing said frame in closed operative relation to said bearing, and a caster wheel supported in the fork of said frame.

8. A caster comprising a hollow frame which initially is open but constructed to be closed in assembling, whereby to retain and hold in proper positions the parts previously assembled therein, said frame comprising a hollow neck portion and a fork portion, the neck portion being adapted to receive the end of the member to be supported on the caster and having projections on the inside thereof in vertically spaced relation to support and retain a bearing against vertical displacement, a plate arranged to engage the lower projections so as to be supported in said neck when the frame is closed thereon, a radial bearing resting on said plate so as to be supported in said neck beneath the upper projections and be retained by said upper projections when the frame is closed thereon, means for securing said frame in closed operative relation to said bearing and plate, and a caster wheel supported in the fork of said frame.

MAX E. DAYTON.